Aug. 16, 1927.
W. DUBILIER
1,639,597
CONDENSER
Original Filed May 23, 1922
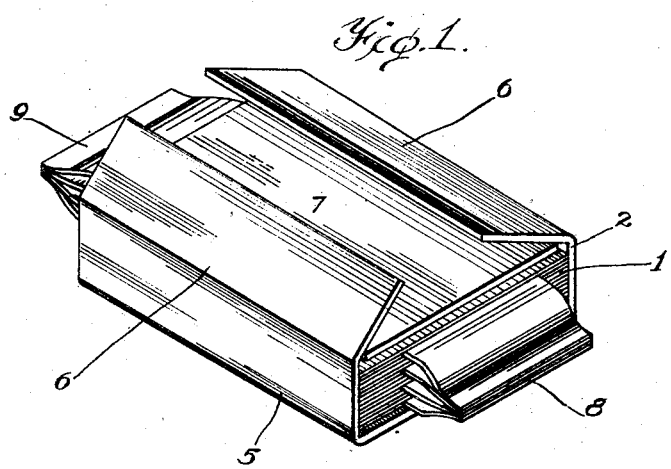
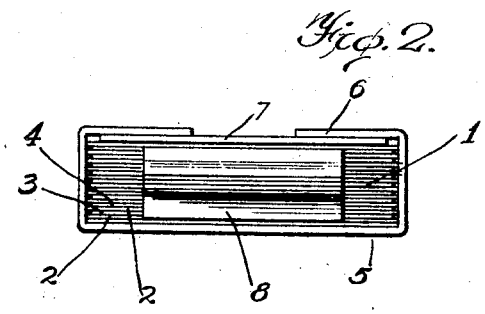
INVENTOR
WILLIAM DUBILIER
BY
ATTORNEY Patented Aug. 16, 1927.

1,639,597

UNITED STATES PATENT OFFICE.

WILLIAM DUBILIER, OF NEW YORK, N. Y., ASSIGNOR TO DUBILIER CONDENSER CORPORATION, A CORPORATION OF DELAWARE.

CONDENSER.

Original application filed May 23, 1922, Serial No. 562,946. Divided and this application filed February 27, 1924. Serial No. 695,570.

My invention relates to improvements in electrical condensers for use in radio and other apparatus.

An object of the invention is to provide a condenser of simple construction, and having a body made up of elements consisting of sheets of conductive material separated by a dielectric, with a clamping member embracing the condenser, and exerting pressure thereon to the required degree, for the purpose of keeping the elements in tight engagement with each other over their entire area, and preventing the formation of cracks which might give entrance to moisture or air.

Other objects and advantages of the invention will appear from the following description, taken with the accompanying drawings, and the novel features of the invention will be defined in the appended claim. But the disclosure is explanatory only, and I may vary the structure actually shown or details of proceeding, to the fullest extent which the scope and spirit of the invention permit.

On the drawings,

Figure 1 is a perspective view showing a condenser in the process of formation according to my invention, and Figure 2 shows such a condenser when finished.

The same numerals identify the same parts throughout.

This application is a division of my prior co-pending application, Serial No. 562,946, for condenser clamping device, filed May 23rd, 1922.

In practice, I make the body 1 of the condenser by utilizing a sheet of suitable dielectric material, such as mica, indicated at 2, for example, in Figure 2, and placing upon the same a sheet of conductive material, such as tin-foil 3. Upon this sheet 3 is laid another sheet of dielectric material 2, and on this second sheet of dielectric material is laid another sheet of conductive material 4. In this way, the stack or body 1 can be built up to contain as many sheets 2, 3 and 4 as desired, the sheets 2, as usual, overlapping the edges of the sheets 3 and 4; and when the stack 1 is completed, I place around it a clamping member 5, which will extend over one face, such as the lower face, and around the sides of the stack, with the ends 6 of this clamp capable of being bent down to engage the opposite or top face of the stack. If desired, I can lay upon this top face a bearing plate 7, to be overlapped by the ends 6.

The sheets 3 will all be of one polarity, and the sheets 4 of opposite polarity. I may cause the ends of the sheets 3 to project at one end of the condenser, as indicated by the numeral 8, bringing the ends 8 together to make a common terminal; while the sheets 4 may be caused to project from the opposite end of the condenser and brought together to form a terminal 9. To connect the condenser in circuit, the terminal 8 is simply joined to one end of the circuit, and the terminal 9 to the other.

In the manufacture of the condenser, the body of the condenser 1 may be compressed, evacuated of air and impregnated with any suitable insulating compound, such as melted wax, and the clamp 5 may be attached by bending it around the body of the condenser, with the plate 7 on the top face thereof and then subjecting the clamp to the action of a power press which will force the clamp tightly against the bottom of the stack and bend down the ends 6 tightly against the bearing plate 7 and the top of the stack. When the condenser is removed from the press, the clamping member 5 will grip it with enough force to produce all the pressure required to keep the sheets 2, 3 and 4 in firm engagement.

The bearing plate 7 may be either of insulating material or metal as preferred. While as many sheets 2, 3 and 4 may be utilized as desired, in some cases I may employ only a single sheet of conductive material embraced by the clamp 5, and employ the clamp itself as a conductive element of opposite polarity, with enough mica to insulate the sheet of conductive material encircled by the clamp, from this clamp. Also I may make the stack 1 in sections, each section consisting of a number of sheets 2, 3 and 4 and when the condenser is assembled as many sections can be put together as required and the clamp 5 placed around them, thereby uniting them all into a single structure.

If desired the projecting ends 8 of the conducting sheets 3 can be inserted between the bottom of the body of the condenser 1, and the clamping member 5, so that the sheets 3 will be in electrical connection with the clamping member when this member is of metal, as stated in my application, Serial No. 562,946 above mentioned.

Having described my invention, what I believe to be new and desire to secure and protect by Letters Patent of the United States is:—

A condenser comprising a stack containing one or more sheets of conductive material separated by insulation, a clamp embracing said stack, the clamp being of stiff, strong, bendable material, and extending over one face of the stack, the clamp being bent across both sides of the stack with its ends turned down against the opposite face, the ends of the clamp being separated, a plate on said opposite face with its opposite edges beneath the separated ends of the clamp and held thereby firmly against said opposite face of the stack, said clamp and plate forming a casing for the stack open at both ends, through which the two extremities of the stack appear, part of the conductive sheets being exposed at one end of the condenser, and part at the other end to enable the condenser to be connected to an electric circuit.

In testimony whereof I affix my signature.

WILLIAM DUBILIER.